(12) United States Patent
Schrader et al.

(10) Patent No.: US 7,486,647 B2
(45) Date of Patent: Feb. 3, 2009

(54) SHARED TIME UNIVERSAL MULTIPLE ACCESS NETWORK

(75) Inventors: Mark E. Schrader, Rochester, NY (US); Allen D. Heberling, Penfield, NY (US)

(73) Assignee: Aster Wireless, West Henrietta, NY (US)

( * ) Notice: Subject to any disclaimer, the term of this patent is extended or adjusted under 35 U.S.C. 154(b) by 769 days.

(21) Appl. No.: 10/859,355

(22) Filed: Jun. 3, 2004

(65) Prior Publication Data
US 2004/0223466 A1 Nov. 11, 2004

Related U.S. Application Data (63) Continuation of application No. 09/690,315, filed on Oct. 17, 2000, now abandoned.

(51) Int. Cl.
*H04B 7/212* (2006.01)
*H04J 3/06* (2006.01)

(52) U.S. Cl. .................. 370/337; 370/347; 370/350; 370/458; 370/503

(58) Field of Classification Search .................. None
See application file for complete search history.

(56) References Cited

U.S. PATENT DOCUMENTS

| | | | |
|---|---|---|---|
| 4,280,216 A | 7/1981 | Zeitrag | |
| 4,316,284 A | 2/1982 | Howson | |
| 4,799,052 A | 1/1989 | Near et al. | |
| 5,247,515 A | 9/1993 | White | |
| 5,398,247 A | 3/1995 | Delprat et al. | |
| 5,576,702 A | 11/1996 | Samoylenko | |
| 5,774,658 A | 6/1998 | Kalkunte et al. | |
| 6,600,746 B1 | 7/2003 | Petersen | |
| 6,728,514 B2* | 4/2004 | Bandeira et al. ........... 455/13.1 |
| 6,963,580 B2* | 11/2005 | Chien et al. ................. 370/445 |
| 6,973,065 B2* | 12/2005 | Hayashi et al. ............. 370/335 |
| 2001/0001609 A1* | 5/2001 | Mikuni et al. ............... 370/337 |
| 2002/0044568 A1* | 4/2002 | Smiljanic .................... 370/468 |
| 2002/0067736 A1* | 6/2002 | Garcia-Luna-Aceves et al. .......................... 370/442 |
| 2002/0126688 A1* | 9/2002 | Lindgren et al. ............ 370/442 |
| 2003/0193963 A1* | 10/2003 | Wright et al. ............... 370/442 |
| 2005/0243745 A1* | 11/2005 | Stanwood et al. ........... 370/280 |

OTHER PUBLICATIONS

U.S. Appl. No. 60/237,017, filed Sep. 29, 2000, Garcia-Luna-Aceves et al., System and Method for Ad Hoc Network Access Employing the Distributed Election of a Shared Transmission Schedule, pp. 1-23.*

* cited by examiner

*Primary Examiner*—Gregory B Sefcheck
(74) *Attorney, Agent, or Firm*—Staas & Halsey LLP (57) ABSTRACT

A method of controlling access to a network media by a plurality of stations, the method including determining a number of time slots; determining a number of slot cycles for each time slot, at least one of the time slots having more than one slot cycle; assigning each station one or more slot cycles in one or more time slots; and operating each of the stations by initializing an access timer to time out at the beginning of the station's assigned slot cycle(s) and transmitting data during the assigned slot cycle(s), the access timer being stopped whenever a station transmits over the network, and restarted at the end of transmission.

8 Claims, 11 Drawing Sheets

14

| CYCLE # | SLOT 0 CYCLE# (STATION) | SLOT 1 CYCLE# (STATION) | SLOT 2 CYCLE# (STATION) | SLOT 3 CYCLE# (STATION) | SLOT 4 CYCLE# (STATION) | SYNC TYPE: STD. OR MASTER |
|---|---|---|---|---|---|---|
| 0 | 0(A) | 0(B) | 0(G) | 0(I) | 0(K) | STD. |
| 1 | 0(A) | 1(C) | 1(H) | 1(G) | 1(L) | STD. |
| 2 | 0(A) | 2(D) | 0(G) | 2(I) | 2(M) | STD. |
| 3 | 0(A) | 3(E) | 1(H) | 3(J) | 3(N) | STD. |
| 4 | 0(A) | 4(F) | 0(G) | 0(I) | 4(O) | STD. |
| 5 | 0(A) | 0(B) | 1(H) | 1(G) | 5(P) | STD. |
| 6 | 0(A) | 1(C) | 0(G) | 2(I) | 6(Q) | STD. |
| 7 | 0(A) | 2(D) | 1(H) | 3(J) | 7(R) | STD. |
| 8 | 0(A) | 3(E) | 0(G) | 0(I) | 8(S) | STD. |
| 9 | 0(A) | 4(F) | 1(H) | 1(G) | 9(T) | STD. |
| 10 | 0(A) | 0(B) | 0(G) | 2(I) | 10(U) | STD. |
| 11 | 0(A) | 1(C) | 1(H) | 3(J) | 11(V) | STD. |
| 12 | 0(A) | 2(D) | 0(G) | 0(I) | 12(W) | STD. |
| 13 | 0(A) | 3(E) | 1(H) | 1(G) | 13(X) | MASTER |
| 1 | 0(A) | 0(B) | 0(G) | 0(I) | 0(K) | STD. |
| 2 | 0(A) | 1(C) | 1(H) | 1(G) | 1(L) | STD. |
| 3 | 0(A) | 2(D) | 0(G) | 2(I) | 2(M) | STD. |
| 4 | 0(A) | 3(E) | 1(H) | 3(J) | 3(N) | STD. |
| 5 | 0(A) | 4(F) | 0(G) | 0(I) | 4(O) | STD. |

FIG. 1a

| CYCLE # | SLOT 0 CYCLE# (STATION) | SLOT 1 CYCLE# (STATION) | SLOT 2 CYCLE# (STATION) | SLOT 3 CYCLE# (STATION) | SLOT 4 CYCLE# (STATION) | SYNC TYPE: STD. OR MASTER |
|---|---|---|---|---|---|---|
| 0 | 0(A) | 0(B) | 0(G) | 0(I) | 0(K) | STD. |
| 1 | 0(A) | 1(C) | 1(H) | 1(G) | 1(L) | STD. |
| 2 | 0(A) | 2(D) | 0(G) | 2(I) | 2(M) | STD. |
| 3 | 0(A) | 3(E) | 1(H) | 3(J) | 3(N) | STD. |
| 4 | 0(A) | 4(F) | 0(G) | 0(I) | 4(O) | STD. |
| 5 | 0(A) | 0(B) | 1(H) | 1(G) | 5(P) | STD. |
| 6 | 0(A) | 1(C) | 0(G) | 2(I) | 6(Q) | STD. |
| 7 | 0(A) | 2(D) | 1(H) | 3(J) | 7(R) | STD. |
| 8 | 0(A) | 3(E) | 0(G) | 0(I) | 8(S) | STD. |
| 9 | 0(A) | 4(F) | 1(H) | 1(G) | 9(T) | STD. |
| 10 | 0(A) | 0(B) | 0(G) | 2(I) | 10(U) | STD. |
| 11 | 0(A) | 1(C) | 1(H) | 3(J) | 11(V) | STD. |
| 12 | 0(A) | 2(D) | 0(G) | 0(I) | 12(W) | STD. |
| 13 | 0(A) | 3(E) | 1(H) | 1(G) | 13(X) | MASTER |
| 1 | 0(A) | 0(B) | 0(G) | 0(I) | 0(K) | STD. |
| 2 | 0(A) | 1(C) | 1(H) | 1(G) | 1(L) | STD. |
| 3 | 0(A) | 2(D) | 0(G) | 2(I) | 2(M) | STD. |
| 4 | 0(A) | 3(E) | 1(H) | 3(J) | 3(N) | STD. |
| 5 | 0(A) | 4(F) | 0(G) | 0(I) | 4(O) | STD. |

SHARED TIME UNIVERSAL MULTIPLE ACCESS NETWORK

This application is a continuation of application Ser. No. 09/690,315, filed Oct. 17, 2000, now abandoned.

FIELD OF THE INVENTION

This invention relates to data transmission networks. More particularly, the invention relates to a method that supports multiple access by network stations to a common communication medium. The invention is an improvement to the Universal Multiple Access protocol.

DESCRIPTION RELATIVE TO THE PRIOR ART

A typical half-duplex communication network includes a number of stations that are connected to a common medium for communication. The communication on the medium follows a defined protocol (or protocols) to provide for multiple access and bandwidth allocation. These protocols determine the sequence of events to be performed by each station to avoid or reduce the instances of station-to-station interference or "collision". The implementation of protocols typically includes a Media Access Controller (MAC) to implement the protocol required to access the physical media and control the transfer of binary data between stations.

The ethernet protocol is one of the more common protocols and permits all stations to access the network equally. Each of the stations or nodes on the network has a network interface card that uses carrier sense multiple access with collision detection. This is commonly referred to as CSMA/CD. According to this protocol, before transmitting, a station will listen for traffic on the media. If no traffic is sensed on the media, the station will start transmitting. After starting a transmission, the transmitting station will monitor the media to determine if there has been a collision due to the access of the media by another station. If a collision is detected the protocol calls for both stations to cease transmission, wait for a random period of time, and reattempt the transmission.

An alternative arrangement for accessing a network media is referred to as a "time slot multiple access" method. Universal Multiple Access or UMA is a specific embodiment of a time slot multiple access protocol. This protocol uses an access technique wherein each station accesses the media in a round robin arrangement during an assigned time slot. A central network manager (master station) initializes the network by assigning one or more time slots to each new station using an initialization message. All stations initialize their respective access timer(s) to time out at the beginning of their assigned time slot(s). All stations stop their access timers whenever a station accesses the network, and restart their timers at the end of each transmission. Each UMA station can transmit only during its assigned time slot(s). This method is equivalent to passing a virtual time token between stations. An embodiment of UMA is disclosed in U.S. Pat. No. 5,774,658 issued Jun. 30, 1998 to Kalkunte et al.

The time slot multiple access method, such as the UMA protocol has the advantage of providing a network with a predetermined set of time slots for accessing the network, bounded access latencies, and a lower bound to the amount of bandwidth to each station based on slot allocation. (A latency is simply a "time delay". An "access latency" is the waiting time from initiating access to the network to when the data can actually be sent. Access "waiting time" is an equivalent term.) For example, a device requiring a large bandwidth can be assigned multiple time slots. UMA also has the advantage of avoiding collisions since each station is allocated a defined time for transmission. Once a station has begun transmitting during its assigned time slot, the timing of time slots is held in abeyance until transmission is completed. Then, the timing of time slots resumes. The transmission times can thus be longer than a time slot.

However, these methods provide less than the desired flexibility in managing the bandwidth assigned to each of the stations on the network. This is due in part to the fact that the maximum latency and minimum throughput for each station is dependent on the total number of time slots. Whenever the number of time slots is changed, the latency and throughput allocated to a station will only remain the same if the number of time slots assigned to that station is changed to compensate for the change in total slots. The number of time slots determine both the maximum number of stations that can be part of the network and the minimum amount of available bandwidth that can be allocated to an individual station. This is true regardless of width of the slot relative to the transmission time allocated by the slot. There is a need, therefore, for an improved Multiple Access Network.

SUMMARY OF THE INVENTION

This need is met according to the present invention by providing a method of controlling access to a network media by a plurality of stations, comprising the steps of:
 a) determining a number of time slots;
 b) determining a number of slot cycles for each time slot, at least one of the time slots having more than one slot cycle;
 c) assigning each station one or more slot cycles in one or more time slots; and
 d) operating each of the stations by initializing an access timer to time out at the beginning of the station's assigned slot cycle(s) and transmitting data during the assigned slot cycle(s), the access timer being stopped whenever a station transmits over the network, and restarted at the end of transmission.

The present invention extends the known time slot multiple access methods such as the Universal Multiple Access protocol to define each time slot's window of access as a "slot cycle". Each station in the network is assigned one or more slot cycles and increments a slot cycle counter at the end of the access cycle for the assigned slot cycle(s). This creates an incrementing cycle number for each slot that is modulo the total number of cycles assigned to that slot. ("Modulo (base (k))" is the integer remainder after division by the modulus k.) The station can only access the network during a cycle and time slot, hereinafter "slot cycle", assigned to it. Each station is assigned one or more slot cycles, via an initialization or synchronization broadcast, by assigning a slot number ("k"), and a cycle number ("j") for that slot, and the maximum number of cycles, "M(k)", for that time slot, and maintains its own slot cycle counter(s) along with its access timer(s) used to determine the start of its time slot(s). Thus, the present invention provides an additional degree of freedom in assigning bandwidth to stations on a network. Stations requiring substantial bandwidth, for example, can be assigned not only an entire time slot or slots, including all slot cycles, but also slot cycles in other time slots. Similarly, stations requiring little bandwidth might only be assigned a limited number of slot cycles within a particular time slot, or as few as one. This would give it less bandwidth than it would have if assigned a whole time slot.

There is provided an improved time slot multiple access method for controlling network station access to a network medium only during an assigned time slot wherein the sequence of time slots is repeatedly cycled. The improvement is that the time slot is shared among multiple stations by allocating more than one station to a time slot by round robin selection.

DETAILED DESCRIPTION OF THE INVENTION

Universal Multiple Access is similar to Time Division Multiple Access (TDMA) in that it divides time up into allocated slots. Unlike TDMA, UMA causes the scheduling of each slot to be changed each time a station transmits a frame of data to another station. The result is a rotation of the time slot scheduling based on network transmissions that are monitored by all online stations. A periodic resetting of the time slot sequence is performed when an active node transmits a synchronization message. The designated sender of the synchronization message also rotates in the same manner as the time slot allocation.

According to standard UMA protocol, each time a standard UMA synchronization message is broadcast by the master station, the owner of each slot is rotated to the next owner. When a time slot's last owner is given access, the ownership is rotated back to the first owner. For this invention, the sequence of slots is then repeated after each station increments its modulo M(k) cycle counter. When the cycle count reaches the largest value of M, a special master synchronization message is broadcast by the master station instead of the standard synchronization message. This message reallocates all slots to their respective first station (cycle 0), as well as resets the time slot sequence. The master synchronization message may be delayed for more cycles than this minimum. One limitation of standard UMA is that the number of time slots must be at least as large as the number of stations. A second limitation of standard UMA is that the station to which a slot is assigned exclusively owns a slot. Only the time of access is rotated. If all of the time slots are allocated, a new station must be denied access until a previously allocated time slot becomes available, or a new slot is added. It is not possible to provide access, even if some allocated stations predictably used very little bandwidth. This invention allows time slots to be shared among several stations. This can be accomplished by assigning one or more three-number access vectors to each station. The three-number access vector corresponds to 1) the time slot number, 2) the slot cycle number within the time slot, and 3) the total number of slot cycles assigned to that time slot. This invention allows the owner of the each time slot to rotate among the member stations. According to the method of the invention, each time slot can have a different number of members stations assigned to it, and each station can be assigned to slot cycles in more than one slot.

Thus, using the method of the invention, access to the network will never be denied to stations with low quality of service (QoS) requirements, as long as the number of cycles within one or more of the time slots can be increased as the number of stations requiring access increases. The stations whose throughput must be maintained will not be affected by the addition of these new low QoS stations. Assigning different numbers of slot cycles to each slot can be used to create tiers of performance, or quality of service (QoS), on the network. Unallocated bandwidth can be returned to other stations in the network by creating un-assigned slot cycles. An unassigned slot cycle has the affect of reducing the bandwidth available to other stations assigned to the same slot and returning that bandwidth to the other slots. Priority for use of this bandwidth is given to the slot that immediately follows the slot having an unassigned slot cycle in time.

Figure 1A:
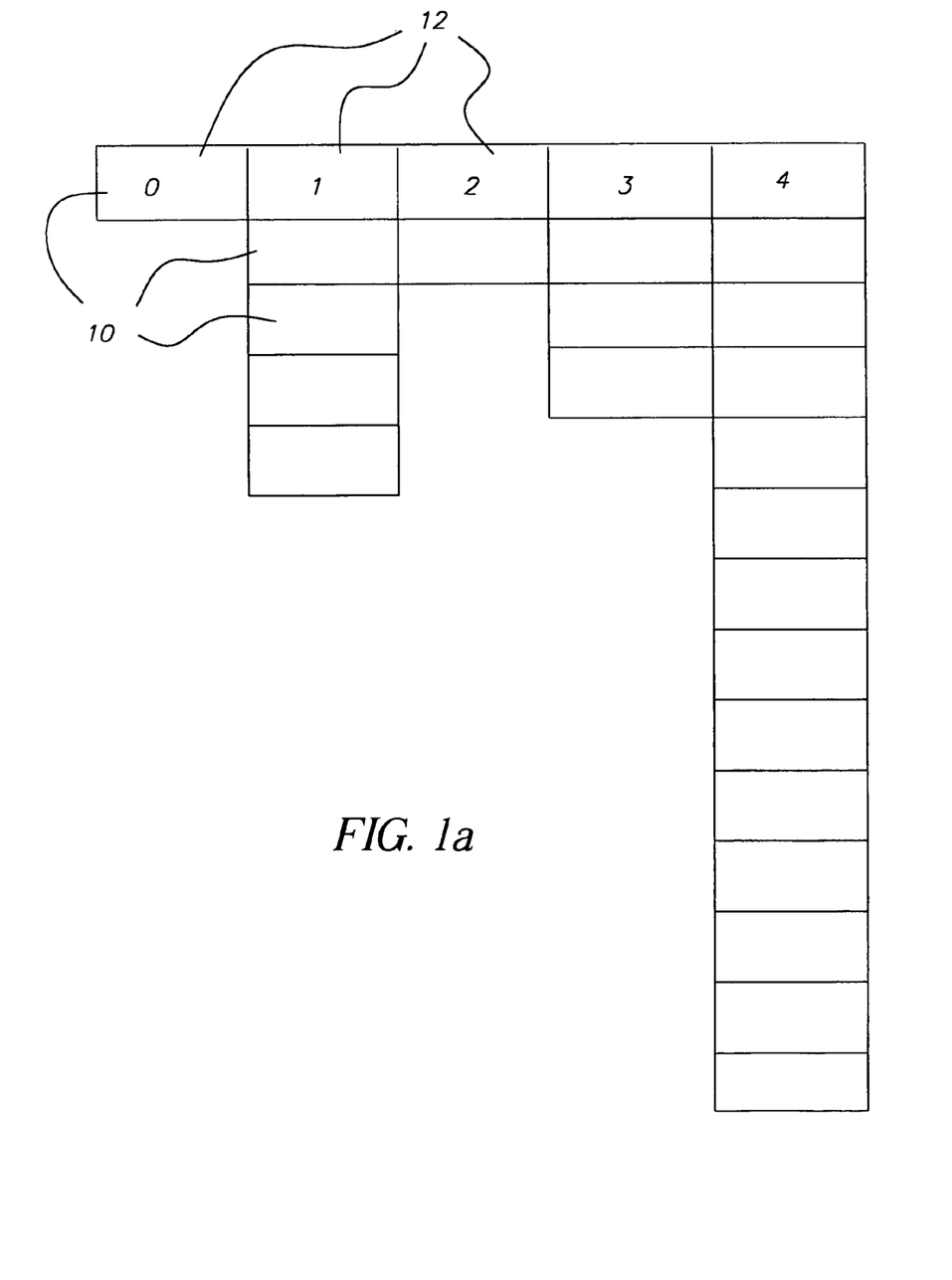
FIG. 1 is a highly simplified diagram illustrating the allocation of bandwidth using time slots and slot cycles according to the invention.
Figure 1B:
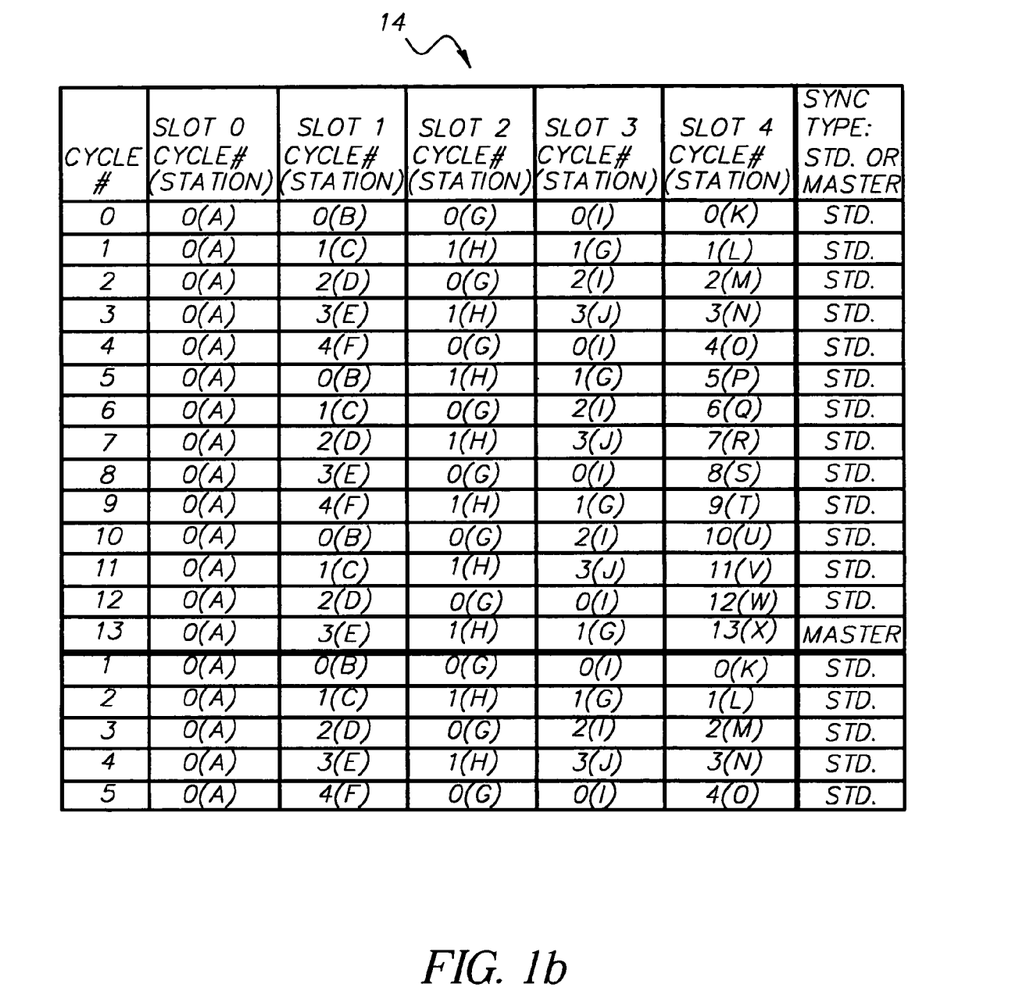

FIGS. 1a and 1b shows simple representation of the shared time slots of the present invention for one possible network system. FIG. 1a shows the allocation of slot cycles (10) to time slots (12) and FIG. 1b shows the assignment of slot cycles to stations. In this example, each row represents one cycle of allocated time slots (represented by columns). There are five allocated time slots, "slot 0", "slot 1", "slot 2", "slot 3", and "slot 4". Each successive row in the diagram represents a new cycle through the time slot sequence. Thus, in row 3 in the "Slot 1 Cycle . . ." column, the "3 (E)" indicates that station "E" is assigned to slot 1 in cycle number three. The number three is the value calculated by each station assigned to slot 1. Since entry in the first column is "0 (A)" there is only one station assigned to this time slot. Note that rotating slot ownership (or priority) according to standard UMA is not a requirement of this invention, and there is no rotation shown in FIG. 1 for the sake of clarity. The one-slot-one-station assignment for time slot "0" is identical to standard UMA.

Each of the time slots has been defined to provide a different number of slot cycles. Time slot 0 has been allocated only one slot cycle. Time slot 1 has been assigned five cycles, time slot 2 has been assigned two cycles, slot 3 has been assigned four cycles, and slot 4 has been assigned 14 cycles. Reviewing the cycles indicated in FIG. 1, it will be noticed that a) station "A" has been allocated all of the slot cycles for slot zero; b) stations "B", "C", "D", "E", and "F" have each been allocated every fifth cycle of time slot 1; c) station "G" has been given every other cycle of slot 2 and every fourth cycle of slot 3; d) station "I" has been given two out of four cycles of slot 3; and e) station "R" has been allocated one out of every 14 cycles in slot 4.

This example network has 24 stations, and only 5 slots, one of which is owned by station "A". Stations requiring only a low quality of service have been assigned to slot 4. The number of stations assigned to slot 4 in FIG. 1 is quite high, and yet has not affected the latency associated with any other slot including slot 0. In assigning station "G" and extra slot cycle in slot 3, the throughput of station "H" was unaffected while that of station "G" was increased.

This invention allows the ownership of each time slot to rotate among M(k) member stations. The "k" stands for the time slot number. According to the invention, each slot can have a different number of member stations assigned to it. In the case where slot k has M(k)=1, there will be one station assigned to the slot as in a standard UMA protocol. If M(k)=2, then two stations will share access, and so on. M(k) can also be referred to as the "total cycles" for slot k. A particular time slot during a particular cycle is a "slot cycle". Each station that is assigned one or more slot cycles in slot "k" is also given the value of M(k) that it will use as the modulus for counting its assigned cycle number.

The last column in FIG. 1b shows that in the absence of any data transmission by the stations, a standard synchronization message is transmitted after the last time slot of each slot cycle. A master synchronization message is transmitted after the time slots have cycled a number of times corresponding to the number of slot cycles of the slot having the most slot cycles.

Figure 2A:
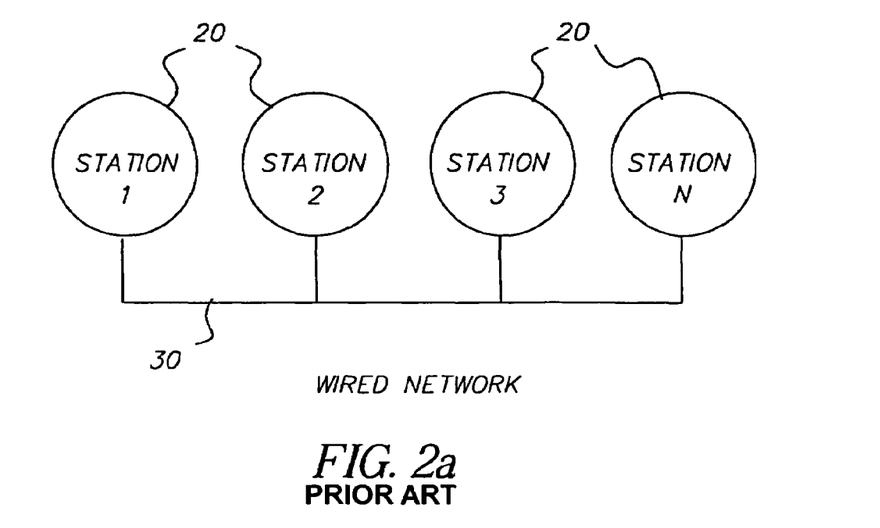
FIG. 2a and b are simplified diagrams of typical networks.
Figure 2B:
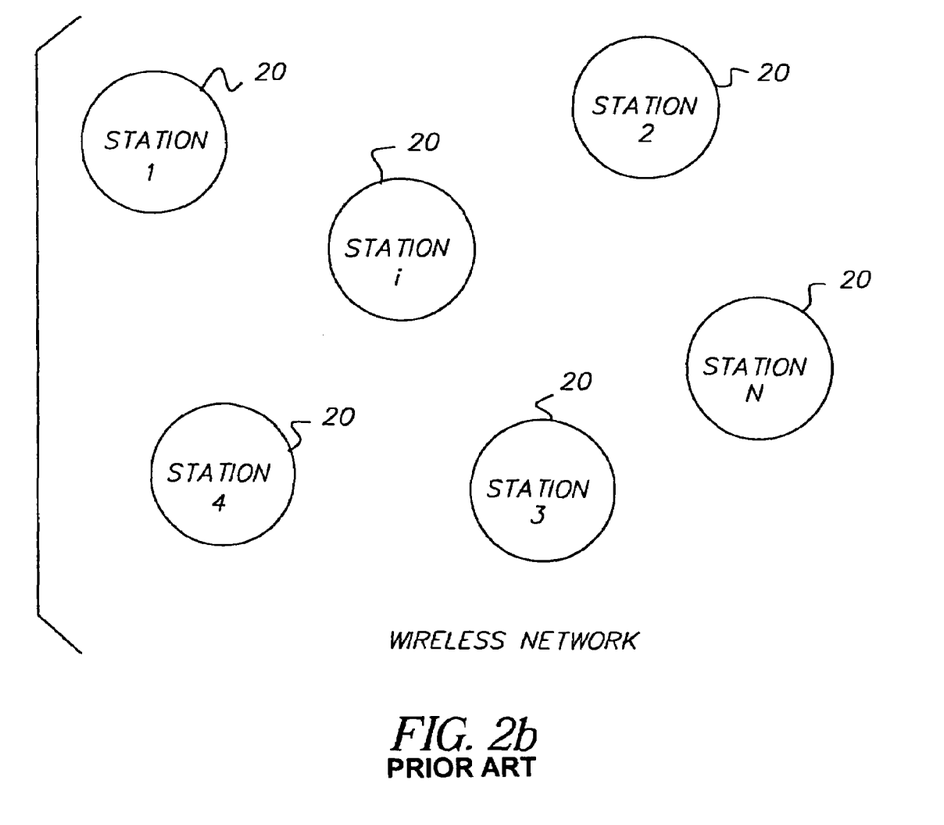

Referring now to FIG. 2, there are shown schematic diagrams of typical networks. For the purposes of the present invention the term "network" or "networks" includes computer networks, communications networks, or any other system for the transmission, reception or other transfer of data. Data includes pictures, video, graphics, text and the like. Data can be transmitted over the network between and among two or more devices. The FIGS. 2a and 2b show block diagrams of typical network configurations. The network comprises a plurality of stations 20 that transmit data or other information to other stations on the network. Only a limited number of stations are shown in the FIG. 2 but it will be understood that the network can include a very large number of stations. The network may have different types of topology including bus, ring, star or mixed. Fault tolerant topologies can also be used with the method of the invention. A fault tolerant topology provides connectivity between the stations even when one or more of the channels of the medium are broken. In FIG. 2a there is shown a wired network with the communications medium indicated by 30. The communication medium, shown by 30 in FIG. 2a, can be any of the known communication mediums such as coaxial cable, fiber-optic cable, telephone line, twisted pair line or other digital line. In addition, the method of the present invention can be used with wireless networks, as shown in FIG. 2b having no physical connection, the communication medium corresponding to a portion of the electromagnetic spectrum. To be part of the network, a station must be in range of the master station "I".

Figure 3:
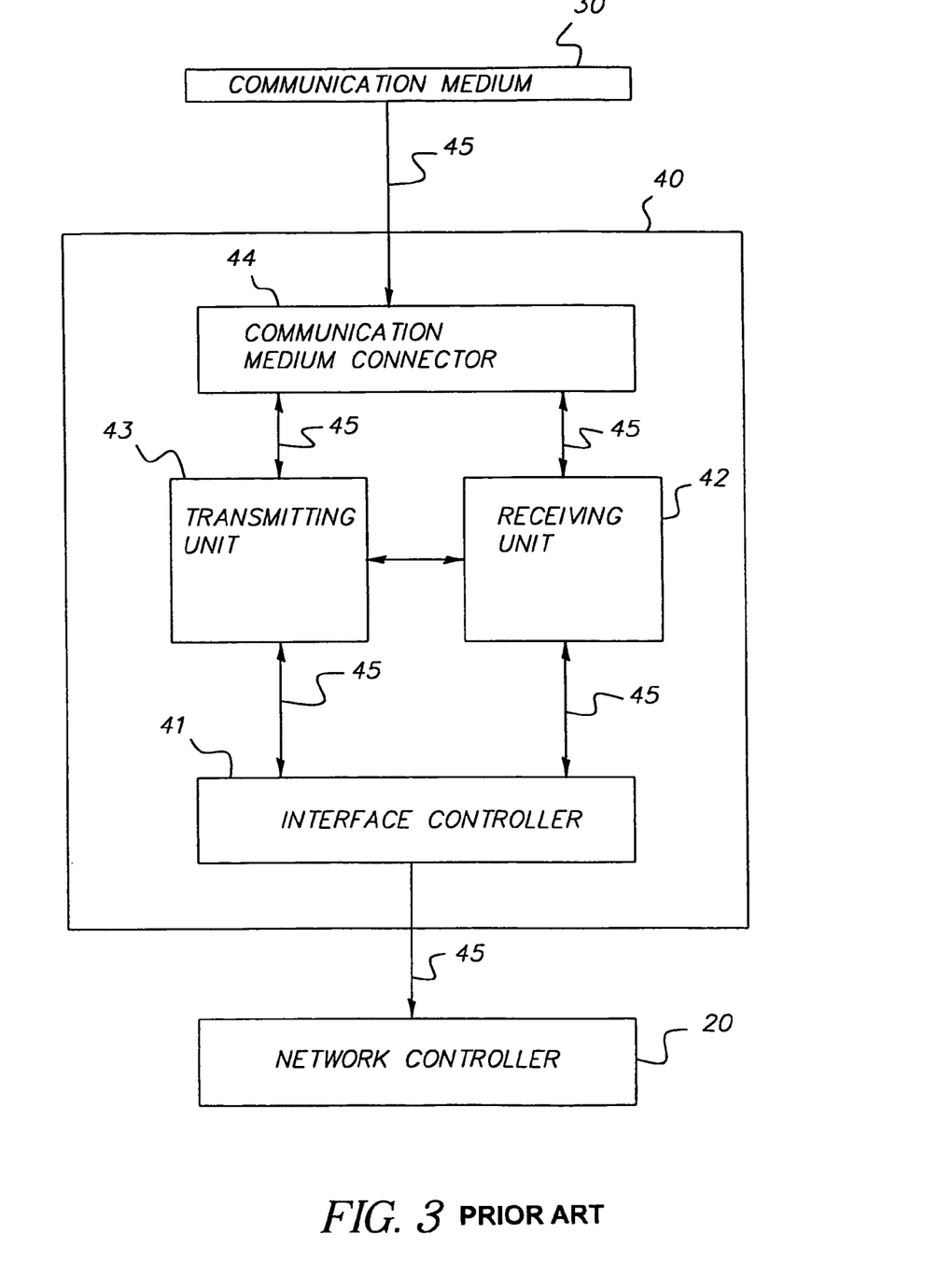
FIG. 3 is a simplified diagram of a typical network interface card.

FIG. 3 is a block diagram of a network adapter, generally shown by 40, that allows for the communication between the network station 20, and the communication medium 30. The network adapter typically includes an interface controller 41 to control the interface between the network station 20 and the remainder of the adapter; a receiving unit 42; a transmitting unit 43; and a connector 44 from the adapter to the communication medium 30. The various components are connected with appropriate circuitry, shown schematically as 45. It is within the network adapter that the method of the invention takes place.

EMBODIMENT DIAGRAMS ACRONYM DEFINITIONS

CAN=Current Access Number. The first slot, {0, 1, ..., Nslots −1}, to have the access window following either the receipt of a valid data frame or synchronization frame, or the transmission of either of these frames, in the rotating priority algorithm. It is initially reset to the time slot assigned to this station, k.

CAT=The Current Access Timer. A duration timer is used to determine the proper time for a station to access the network or send out a synchronization message. It is reset, started, or stopped according to the algorithm specified in the flow diagrams.

Taw=The duration of an "access window".

CATW=The Current Access Timer Window. The number of the current time slot or access window. This number varies from 0 to $N_{slots}-1$. Each window is Taw in width.

PATW=Previous CATW.

FAW=First Access Window. The first slot, {0, 1, ..., Nslots−1}, to own the access window following either receipt of a valid data frame or synchronization frame, or the transmission of either of these frames, in the round robin access algorithm. It is initially set to time slot 0.

$N_{slots}$=The total number of time slots for this network.

M(j)=The total number of cycles associated with time slot j that can be assigned to various stations.

k=The time slot assigned to this station.

CC(k,s)=is the cycle count for slot k, which is assigned to this station, s, for access to the network.

Q=A parameter. Q is always at least as large as the smallest count necessary to guarantee that the slot with the largest number of total cycles assigned to it has "seen" at least that many access windows. This ensures that every station assigned to that slot has had the opportunity to transmit once before a master reset is issued, causing all cycle counters to be reset back to zero. If Q is too small, some stations will never be able to access the network because their cycle (access window) will never occur. Thus Q is greater than or equal to Max M(j) for j={0, 1, 2, ..., Nslots−1}, defined hereafter as M(m). If the slot priorities are rotated and if the index of the largest M(j), m, is not the slot assigned to this station, k, then the "(Nslots−1)" multiplier is necessary to guarantee that at least M(m) access windows for slot m have occurred regardless of network traffic. If the slot access is strictly sequential then Q>=2*M(m). This is true unless the number of idle access windows required before a sync message is (>=Nslots) so that the last access window prior to a sync message always belongs to the last slot, number Nslot−1. Under these conditions, Q is >=M(m)+1. The "+1" accounts for the possibility that slot k may be before slot m, where k<m.

SWO=Sync Window Offset. The offset in integer numbers of access windows, assigned this station that determines the time from the last slot's accesses window to the time when this station must issue a Sync message. This is for the round robin access example only. This value is assigned to each station in addition to the slot and the slot cycle. The station that is assigned the value zero, will always issue the Sync message until it becomes unavailable to do so.

TM=The type of the next message pending transmission as soon as the station changes to transmit mode.

SCC=Slot Cycle Counter. This is incremented by 1 each time the kth slot cycle access time occurs until the Master Sync message is scheduled or received. At this time, SCC is reset to zero.

CACC=Current Access Cycle Counter. Its value is (SCC) Mod M(k), which is used to determine when time slot k belongs to this station, CACC=CC(k,s).

TRT=Time to switch from receive to transmit.

TTR=Time to switch from transmit to receive.

Figure 4:
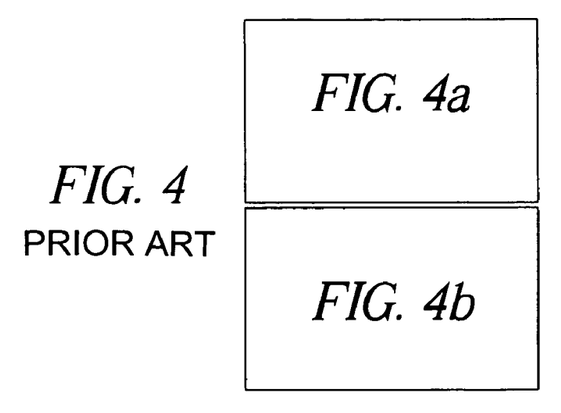
FIG. 4 is a flow chart of the operation of the receiving MAC logic in an interface card or other implementation.
Figure 4A:
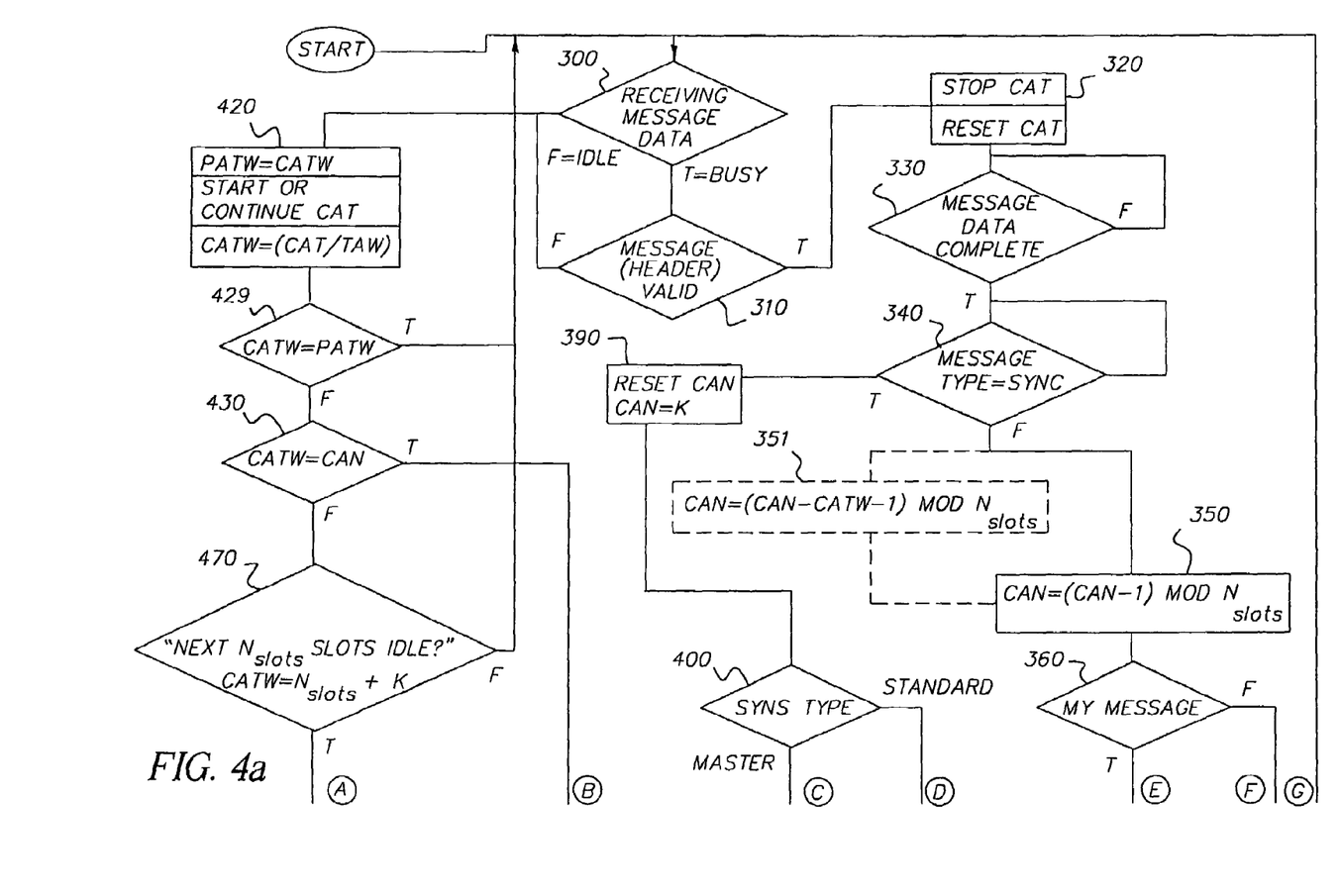
Figure 4B:
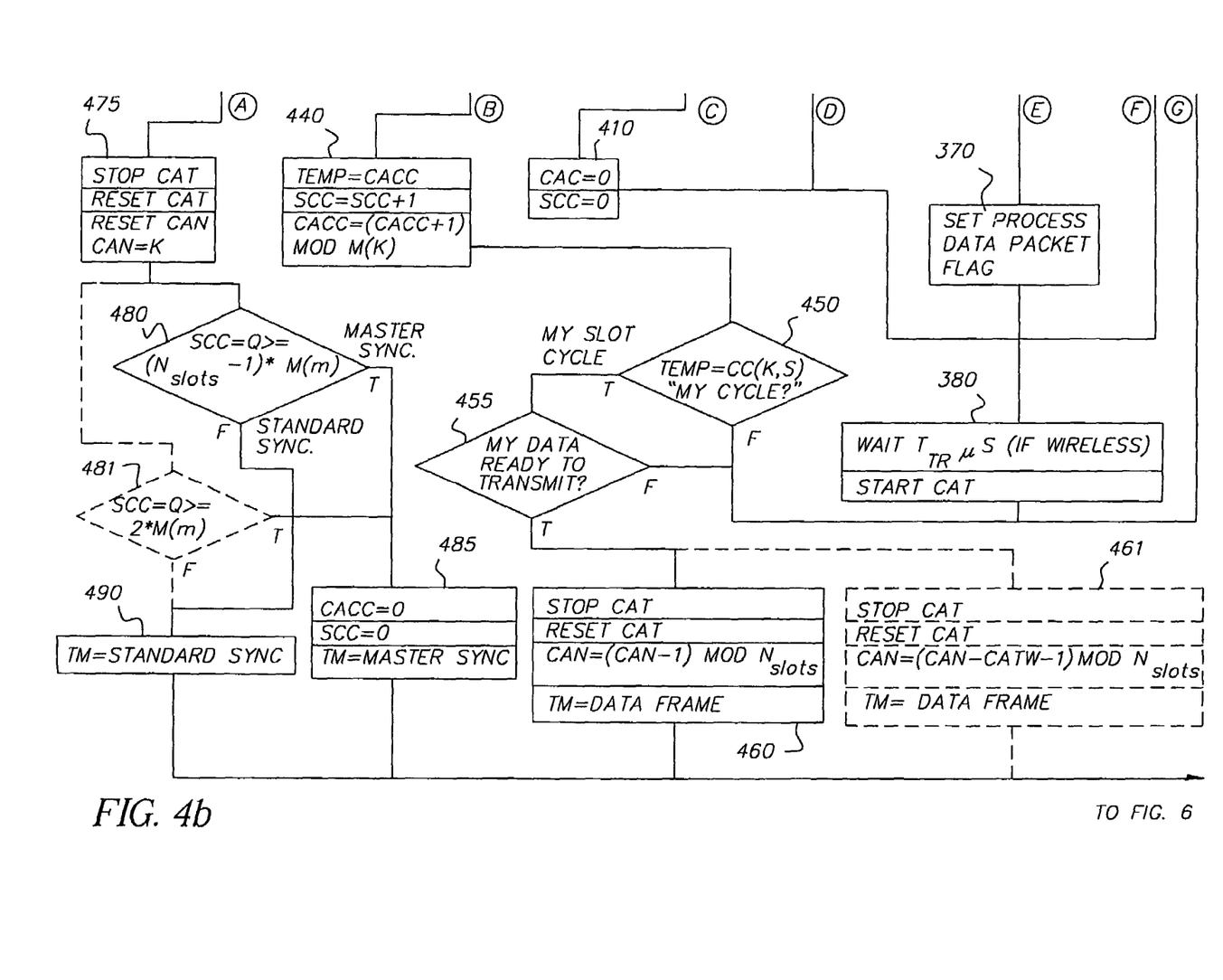

FIG. 4 is a flow chart of two similar embodiments of the invention in a UMA architecture. The first embodiment (embodiment 1, indicated by solid flow lines) includes rotating the current access number, CAN, by a fixed amount according to Samoylenko (U.S. Pat. No. 5,576,702 issued Nov. 19, 1996)) and the second (embodiment 2 including dotted flow lines) includes changing the current access number to give priority to the station assigned a slot after the one most recently transmitted, according to Near et al. (U.S. Pat. No.

4,799,052 issued Jan. 17, 1989). This flow chart will explain the operation of the receiving unit in the controller previously described. During operation, the receiving unit tests, at block 300 to determine whether a message is being received. If a message is being received, which in a typical network means that some preamble and start of frame sequence has been received, and in addition, a valid header has been received as in block 310, then the current access timer, CAT, is stopped and reset at block 320 and it is determined whether or not the message is complete at block 330. If the header/message is not valid, the logic checks the value of the CAT at 420. When the message is complete as determined at 330, the message is tested at block 340 to determine whether or not the message type is a synchronization message. If the message is not a synchronization message, the CAN is set to (CAN-1) Mod $N_{slots}$ in block 350 for embodiment 1 or (CAN-CATW-1) Mod $N_{slots}$, in block 351 for embodiment 2. Next, the message is tested to see if it is intended for this station at 360 and if it is, the flag to indicate to the station to process data is set at 370. If the message is not intended for this station, then the logic returns to the path to test if the communication channel is idle (block 300) after an appropriate delay and the restarting of the CAT in block 380.

Returning to block 340, if the message is a synchronization message the CAN is reset at block 390. The message is tested at 400 to determine whether or not it is a master synchronization signal. If so, the current access cycle counter (CACC) and the slot cycle counter (SCC) are set to 0 at block 410. The logic returns to the path to test if the communication channel is idle after an appropriate delay and the restarting of the CAT in block 380. For a standard synchronization message, the CACC and SCC are not reset.

Returning to block 300, if the communication medium is idle, the current access timer is started if it is not already running at block 420. This block also computes, CATW, the current value of the CAT in units of the number of access window intervals after saving the initial value of CATW as PATW. The value of CATW is first tested in block 429 to see if it has changed, indicating that a new access window is begun. If not, the previous access window is still present and no further tests on the window are required. Otherwise the new value of CATW is tested in block 430 to determine if the time is in the time slot for this station. If this is true, "temp" is set to the current access cycle counter (CACC), the slot cycle counter (SCC) is incremented by 1 and the CACC is incremented by 1 Mod M(k), which is the number of total cycles assigned to slot k, at block 440. "Temp" is then tested to determine whether this is a slot cycle assigned to this station at block 450. If true, the transmit frame ready condition is tested at block 455 to see if the station has data to transmit. If true, CAN is sent to (CAN-1) Mod $N_{slots}$, in block 460 for embodiment 1, or (CAN-CATW-1) Mod $N_{slots}$, in block 461 for embodiment 2. In addition the transmit message (TM) flag is set to Data Frame and the logic proceeds to the transmit sequence, described in reference to FIG. 5. If the slot cycle is not assigned to this station as tested in block 450 or there is no data ready for transmission in block 455, then the logic returns to the path to test if the communication channel is idle in block 300.

Returning now to block 430, if the time is not in the time access window allotted for this station, the current access timer (CAT) is tested at block 470 to determine if the idle time has reached the ($N_{slots}$+k) time value allocated to this station. If this is false, the logic returns to the path to test if the communication channel is idle at block 300. If the time limit is reached, this station must transmit the next synchronization message. To do so the current access number is set to the slot allotted to this station and the current access timer is reset at block 475. Then, the slot cycle counter (SCC) is compared to Q at block 480 for embodiment 1 or block 481 for embodiment 2. Q is a value that guarantees that between two successive master synchronization messages, that there is at least one access window present for each cycle owned by the slot, m, which is defined as the slot with largest number of assigned cycles, M(m). In the example shown in FIG. 1, m is slot 4, and M(m) is 14.

For embodiment 1, the value for Q is shown in block 480. An example of why this number was chosen can be illustrated by the following case. The station associated with block diagram FIGS. 4, 5, and 6 has been assigned slot k. This station will be allowed to transmit data during each access window assigned to it provided that the current cycle is the assigned cycle as well. Suppose that M(m)=M(k+2) will have the largest number of cycles assigned to it. Suppose that both station k and station k+1 have all cycles assigned them. In addition, assume that no other stations in this network except for station k and station k+1 will access the network for a period of time. Under these conditions, station k will count $N_{slot}$-1 access windows for slot k, for each access window counted by the station assigned to slot k+1. This is because slot k+1 is being "blocked" by station k, which gets access for each cycle, that is it remains ahead of k+1 in the priority chain Therefore, Q must be set equal to this upper limit of ($N_{slot}$-1)*M(m) to guarantee that M(m) access windows are counted by any station that is assigned to slot m.

In embodiment 2, shown in block 481, a specific case will be presented demonstrate why the choice for Q is 2*M(m), In this case, only one station, k, is accessing the network and does so periodically. There is one synchronization message between, k's, accesses. To illustrate, if the number of slots is 5, k=1 and m=3. Then the repeating sequence of access windows is 01234012S, where "S" indicates a synchronization message. It can be seen in this worst case, that there are twice as many access widows counted for the access window that we are counting, window 1, as for window 3, whose count we need to estimate. Although this network traffic pattern may not be likely, Q must be chosen to guarantee access by all slot cycles. Thus the value of 2*M(m) is used for Q.

Returning to blocks 480 and 481, if SCC is equal to Q, then the master reset sets CACC and SCC to 0 to reset all cycle counters, the TM is set to Master Sync at block 485 and the logic proceeds to the transmit sequence. At block 480 or 481, if SCC is not equal to Q, TM is set to Standard Sync at 490 and the logic proceeds to the transmit sequence.

Figure 5:
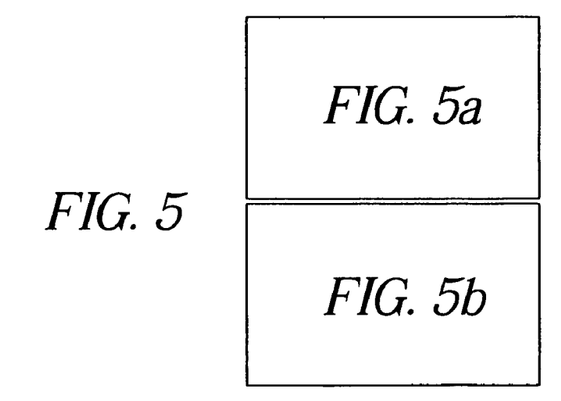
FIG. 5 is a flow chart of the operation of an alternative receiving MAC logic in an interface card or other implementation.
Figure 5A:
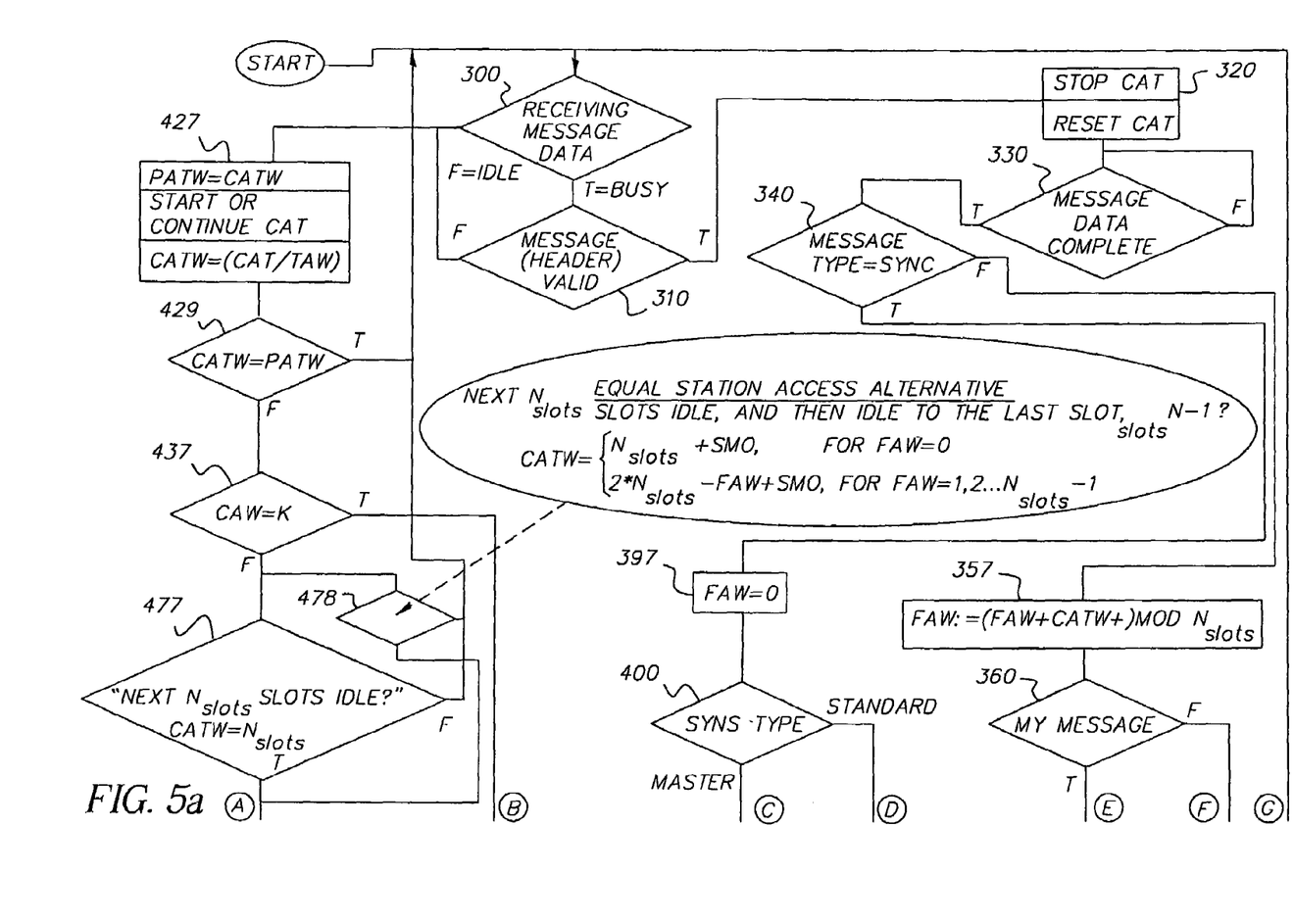
Figure 5B:
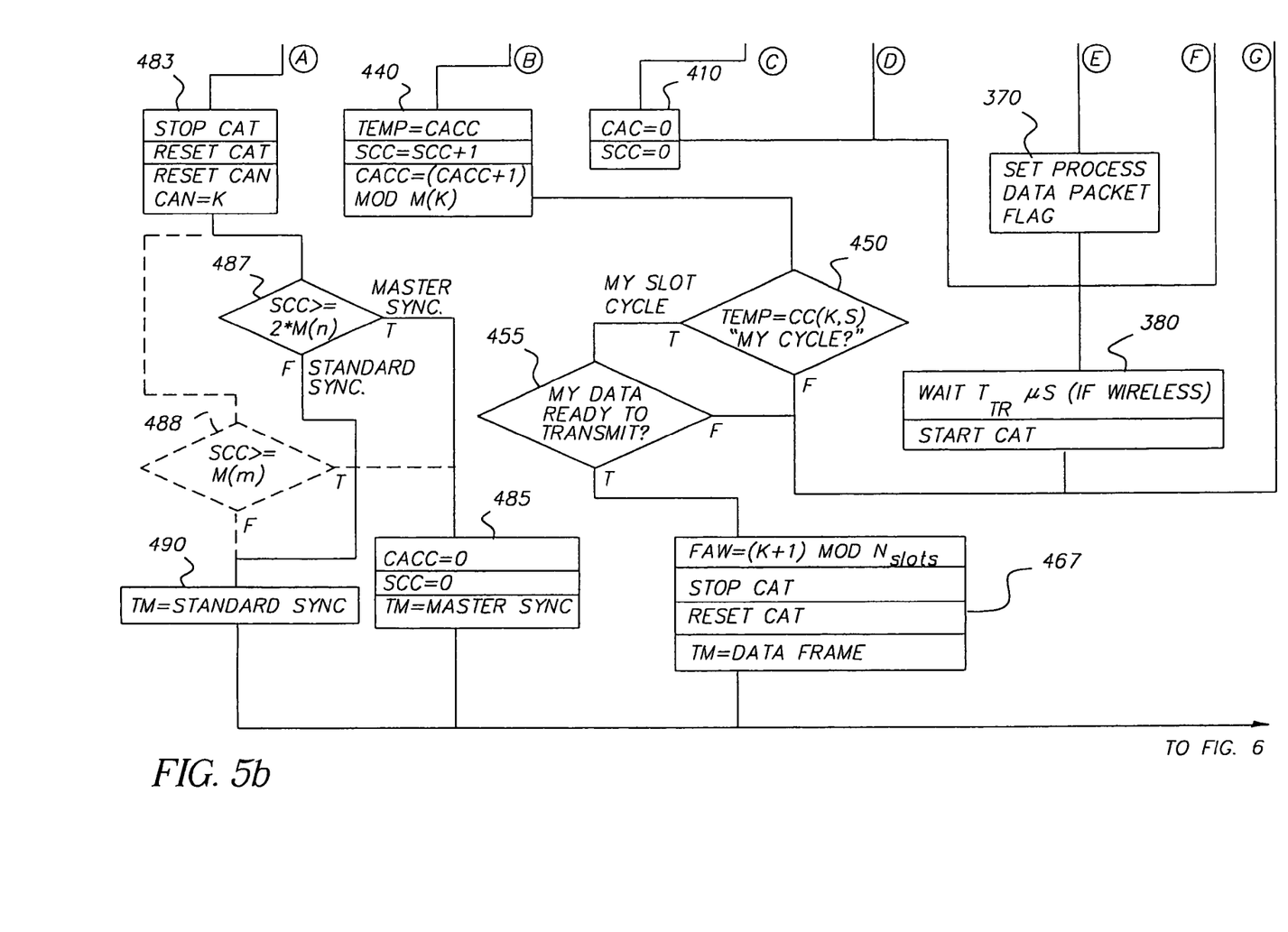

It has been shown that the shared time token invention can be incorporated into prior art, and that neither embodiment guarantees identical numbers of access windows for slots and their corresponding cycles. The flow diagram for two preferred embodiments of this invention is shown in FIG. 5. Blocks that have changed from FIG. 4 have been assigned new numbers. These two embodiments differ from the previous two in that access numbers (slot numbers) are not changed by this protocol. The access number for the station shown in FIG. 4 is always equal to its assigned value of k.

Starting with block 357, these two embodiments no longer use a current access number, CAN, that changes, but instead use a first access window, FAW that changes. In the previous embodiment, the first access window was always zero and the access numbers of the slots changed. Here the slots have fixed access numbers, (in FIG. 5, CAN=k) and we set FAW to the first access window position. First access window is always the number of the next slot after the slot whose message was just received or transmitted. FAW is modulo $N_{slots}$, which allows access to cycle back to the first slot after the last slot has had access. The slots are numbered 0,1 ... $N_{slots}-1$ as before. Block 357 uses the value of CATW computed in block 427 to calculate FAW when a message is received in blocks 300, 310, 320, 330, and 340. Similarly block 397 in FIG. 5 has replaced block 390 in FIG. 4 to satisfy the requirement that the FAW must be reset rather than the CAN for the case that a synchronization message is received.

Block 467 sets the value of FAW when this station is about to transmit data in its own slot cycle. Since the value of its slot is always k, the next slot is k+1, a constant.

Looking at the idle branch of block 300 (block 427) CAW is now computed using the current value of FAW as the starting access window. The check for whether the current access window belongs to my slot, k, is shown in block 437. If the current access window belongs to slot k, then the management of the cycle counters (block 440) and the check for my cycle (block 450) are the same as in the previous embodiment.

Blocks 477 with 487 represent embodiment 3, and block 478 with block 488 represents embodiment 4 of this invention. The quantity SWO is the synchronization window offset, a value assigned to this station along with its slot and cycle. The station with SWO=0 will always send the synchronization message, until the value of SWO=0 is reassigned or until the station goes off line. The independence from slot and cycle number is especially useful in wireless networks where rotating the master station may be undesirable. This is especially true if the master station is required to be in range of all network stations at all times or the station must also manage the assigning of time slots and cycles. For the remainder of this discussion, it will be assumed that there is always a station with SWO=0.

Embodiment 3 (solid flow lines in FIG. 5) is similar to embodiment 2 (FIG. 4) in its check for idle access windows (slots). Block 477 checks for $N_{slots}$ idle slots before testing for whether a master synchronization is required in block 487. The 2*M(m) is used to guarantee that M(m) access windows for slot m have occurred.

Embodiment 4 (including dotted flow lines in FIG. 5) substitutes the test shown in block 478 for the test shown in block 477. This could be implemented using a lookup table with $N_{slots}$ entries, using FAW as the index. This test varies the number of idle slots required to transmit the synchronization message from $N_{slots}$ to $2*N_{slots}-1$, which in turn causes the synchronization message to always be sent after the last slot's access window. One advantage is that all slots are guaranteed the exact same (known) number of access windows between synchronization pulses. This is why embodiment 4 is called "Equal Station Access" and that the number M(m) for slot m can be counted by counting access windows for any slot k.

Figure 6:
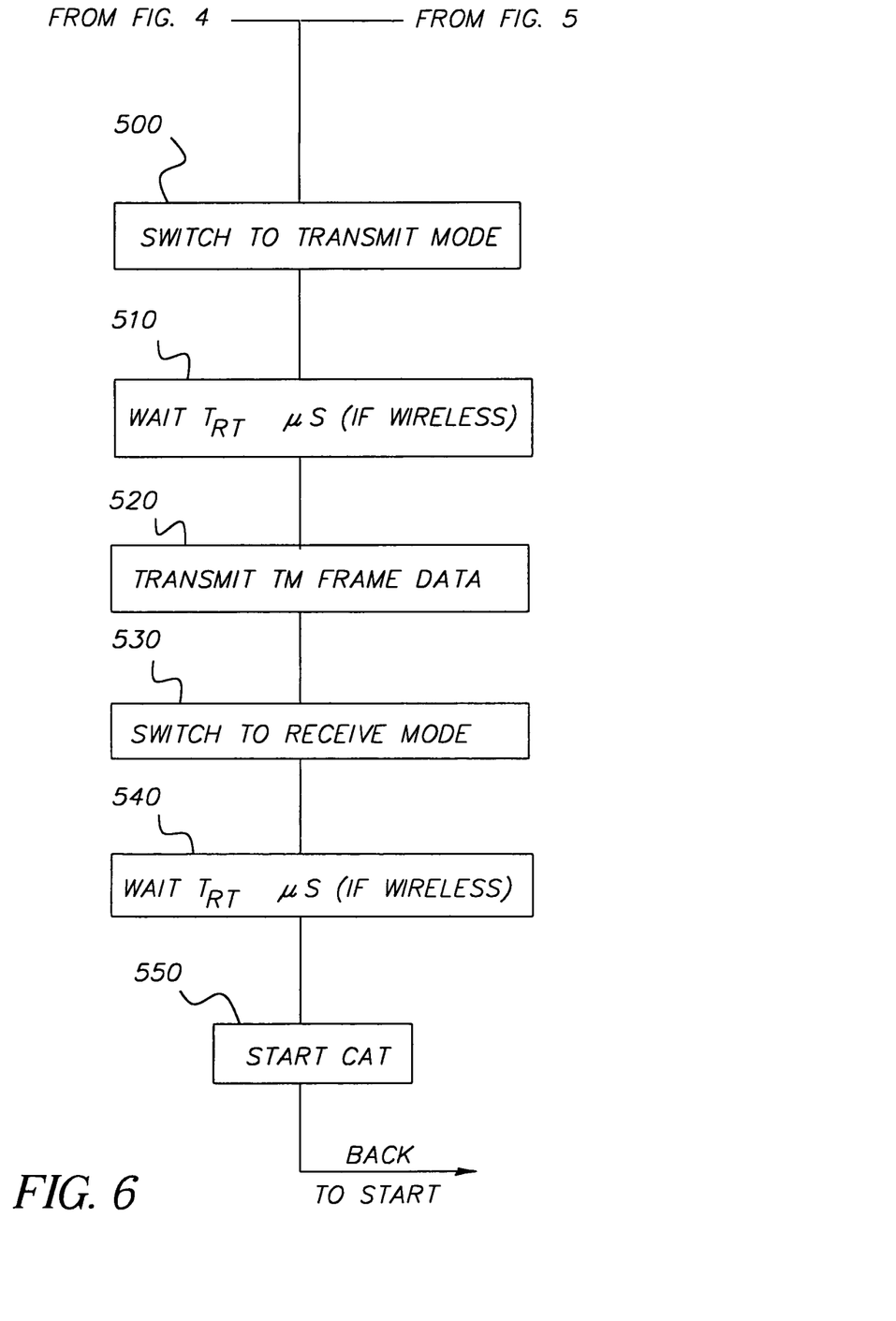
FIG. 6 is a flow chart of the operation of the transmitting MAC logic in an interface card or other implementation.
Figure 7:
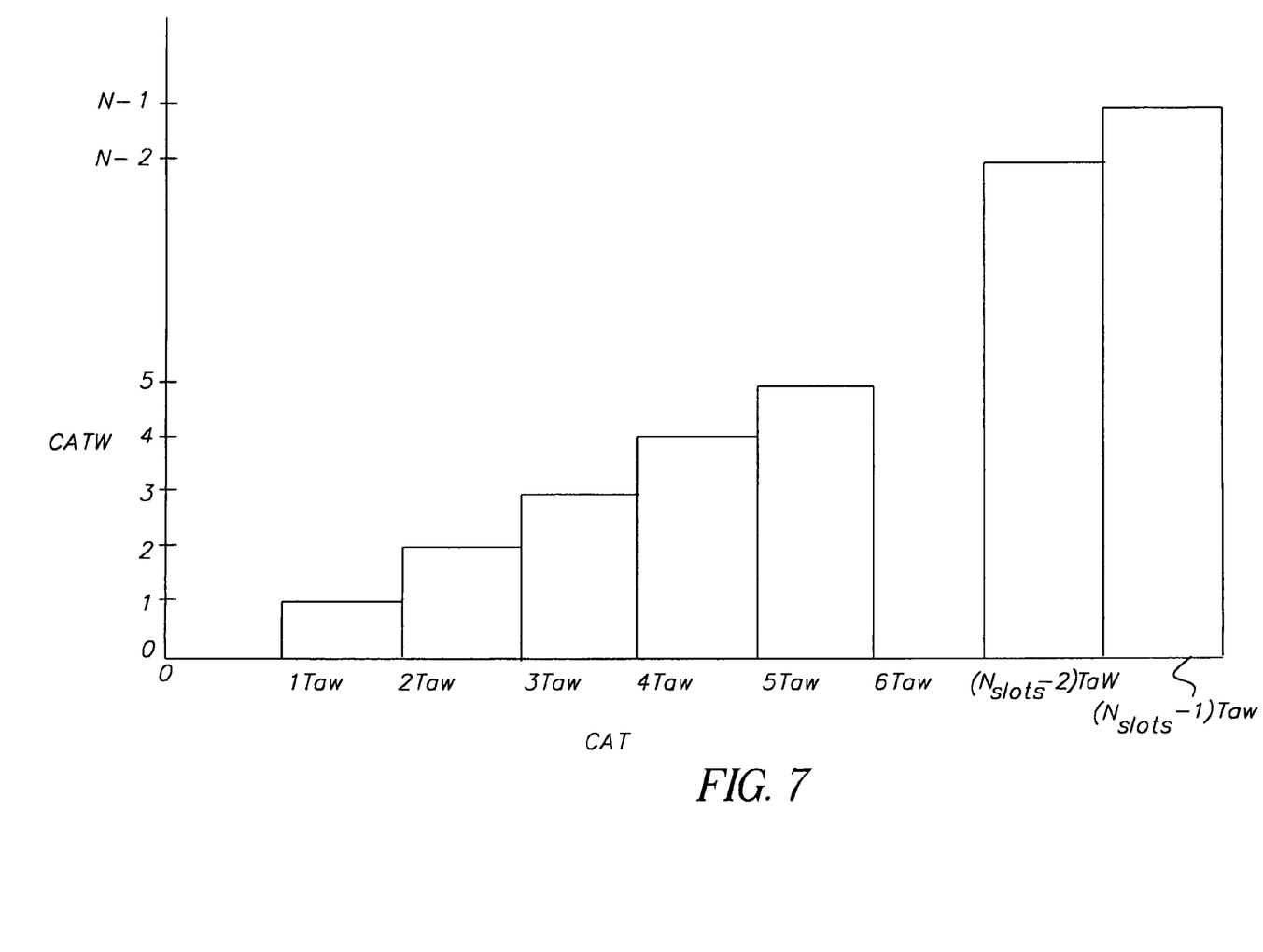
FIG. 7 shows a graph of CATW as a function of CAT.

The flow diagram for the transmit process is shown in FIG. 6. In the event that it has been determined that there is data and that it is time for the station to transmit, the logic switches the interface card, transceiver, etc. to transmit mode in block 500. Then the logic waits for an amount of time necessary for the unit to accomplish this transition (block 510) and then transmits the frame data in block 520. The interface card is switched to the receive mode in block 530 and, after waiting a suitable time to accomplish this transition (block 540), the logic starts the CAT in block 550 and returns to the receive mode.

What is claimed is:

1. A method of controlling access to a network media by a plurality of stations, the method comprising:
    determining a number of time slots;
    determining a number of slot cycles for each time slot, at least one of the time slots having more than one slot cycle;
    assigning each station one or more slot cycles in one or more time slots;
    operating each of the stations by initializing an access timer to time out at the beginning of the station's assigned slot cycle(s) and transmitting data during the assigned slot cycle(s), the access timer being stopped whenever a station transmits over the network, and restarted at the end of transmission; and
    sending a standard sync signal after a cycle of each of the time slots, and sending a master sync signal after the time slots have cycled a number of times corresponding to the number of slot cycles of the time slot having the most slot cycles.

2. The method claimed in claim 1, further comprising providing unassigned slot cycles in a time slot, thereby reducing the bandwidth available to stations having slot cycles in the same time slot, and shifting the bandwidth to the other slots with priority given to the slot immediately following the slot having the unassigned slot cycle.

3. The method claimed in claim 1, wherein the stations include an access timer that is initialized in response to a synchronization signal and wherein the stations are operated according to a Universal Multiple Access protocol that includes using a current access number CAN.

4. The method claimed in claim 3, wherein the CAN is rotated by a fixed amount.

5. The method claimed in claim 3, wherein the CAN is changed to give priority to give priority to a station assigned to a slot after the one that most recently transmitted.

6. The method claimed in claim 1, wherein the stations are operated according to a protocol that includes using a first access window FAW that represents the slot number of the next slot after the slot whose message was just received or transmitted.

7. A method of controlling access to a network media by a plurality of station, the method comprising:
    determining a number of time slots;
    determining a number of slot cycles for each time slot, at least one of the time slots having more than one slot cycle;
    assigning each station one or more slot cycles in one or more time slots; and
    operating each of the stations by initializing an access timer to time out at the beginning of the station's assigned slot cycle(s) and transmitting data during the assigned slot cycle(s), the access timer being stopped whenever a station transmits over the network, and restarted at the end of transmission;
    wherein a slot cycle is assigned to a station using a three number access vector including a time slot number, a slot cycle number within the time slot and a total number of slot cycles assigned to the time slot.

8. The method of claim 7, wherein the controlling access to the network media by the plurality of stations is conducted in a network adapter.

* * * * *